Aug. 28, 1934. W. J. STUBER 1,971,995
CURTAIN ROLLER
Filed Oct. 3, 1932 3 Sheets-Sheet 1
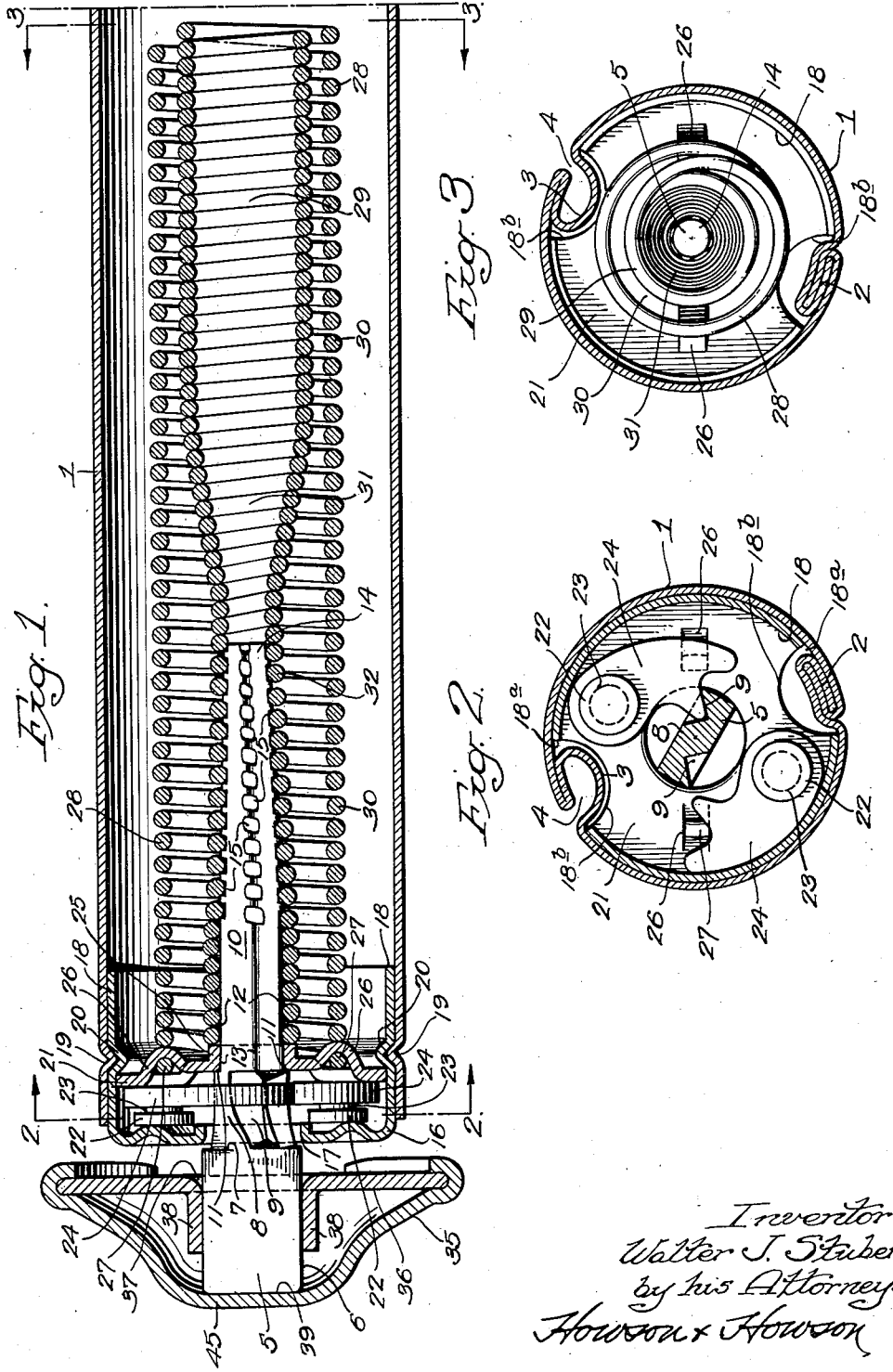
Inventor:
Walter J. Stuber
by his Attorneys
Howson & Howson

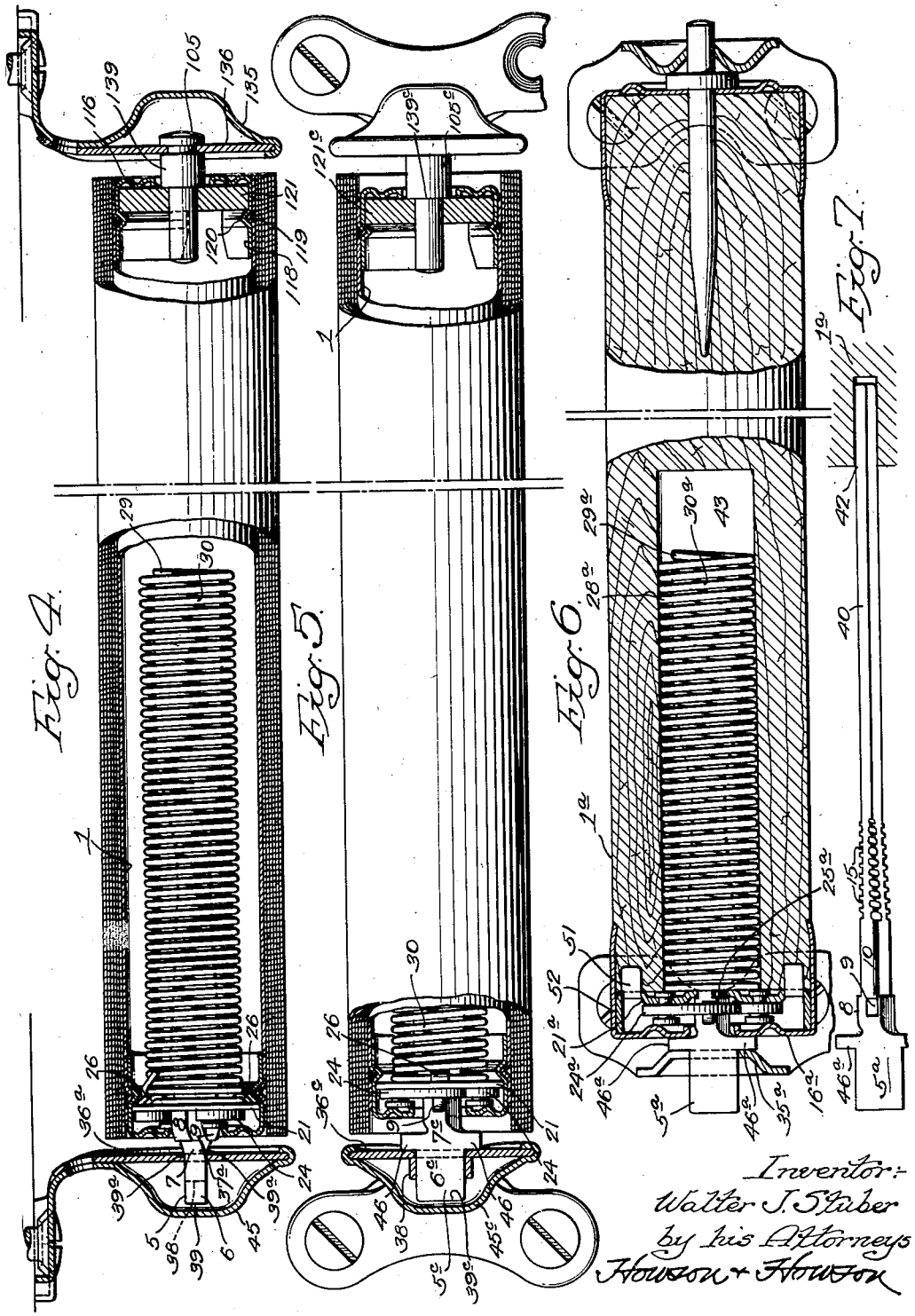

Aug. 28, 1934.  W. J. STUBER  1,971,995
CURTAIN ROLLER
Filed Oct. 3, 1932  3 Sheets—Sheet 3
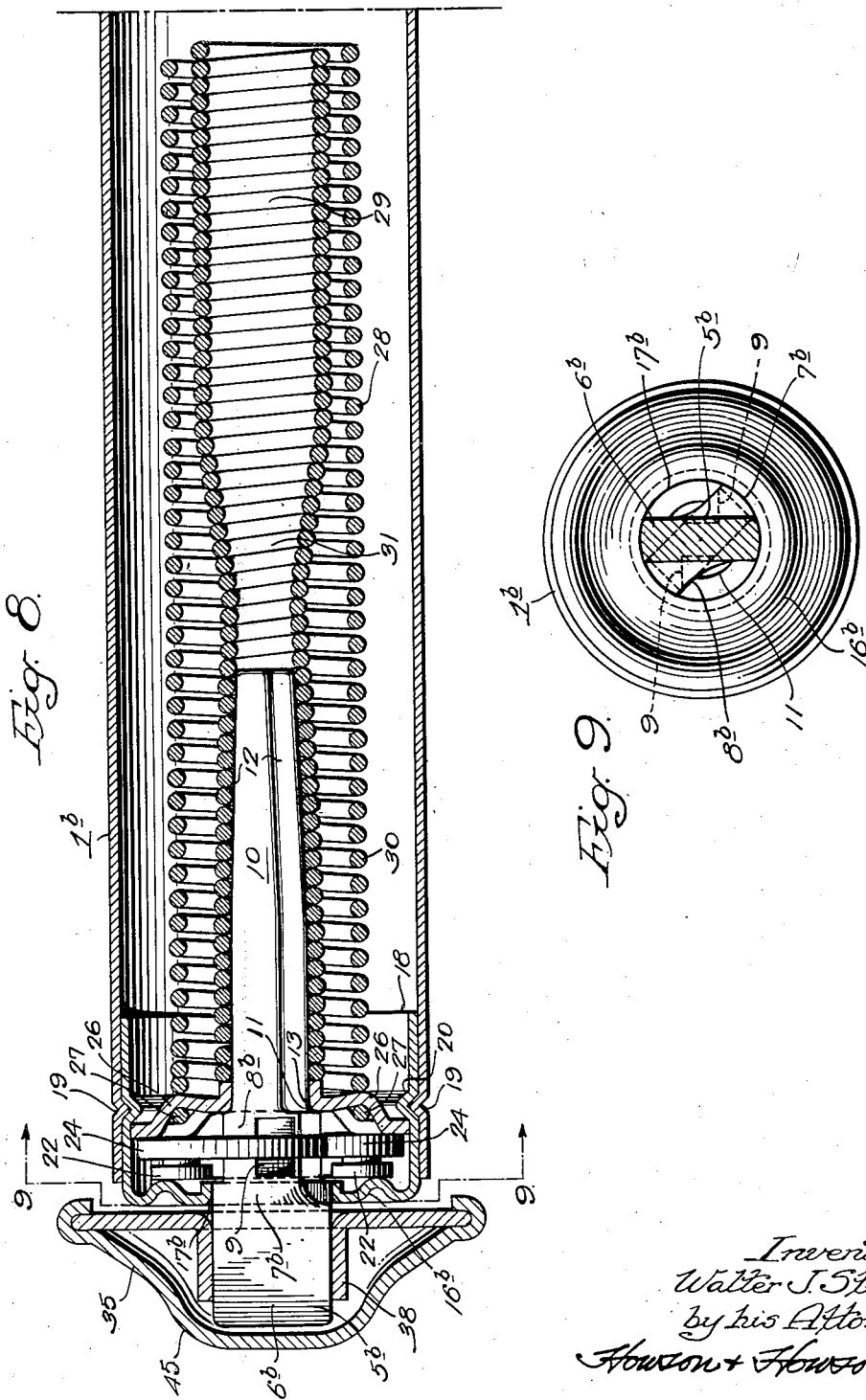
Inventor:-
Walter J. Stuber
by his Attorneys
Howson + Howson Patented Aug. 28, 1934

1,971,995

UNITED STATES PATENT OFFICE 1,971,995

CURTAIN ROLLER

Walter J. Stuber, Philadelphia, Pa., assignor to Carey-McFall Co., Philadelphia, Pa., a corporation of Pennsylvania Application October 3, 1932, Serial No. 636,071

20 Claims. (Cl. 156—36)

This invention relates to spring-loaded curtain roller assemblies. The present application constitutes a continuation in part of the applicant's prior application Serial Number 580,706, filed December 12, 1931, and is a companion to the applicant's copending applications Serial Number 636,072, and Serial Number 636,073, each filed on October 3, 1932, and respectively patented under Numbers, 1,928,549, and 1,928,550, each on September 26, 1933.

The principal object of the present invention is to provide a spring-loaded curtain roller assembly consisting of a minimum number of parts that may be inexpensively manufactured and assembled and which will function in a highly efficient manner.

Another object of the invention is to provide actuating mechanism for the roller which may be fully assembled as a unit and adjusted for proper operation before being inserted into the roller.

Another object of the invention is to provide a roller supporting and actuating mechanism employing a relatively short trunnion that will require but a single relatively narrow bearing in the roller for efficient operation of the mechanism as a unit.

Another feature of the invention is the provision of an actuating spring of unique construction connected in a unique manner to the short trunnion and with respect to the trunnion bearing, whereby the use of the single narrow bearing is made possible.

Another object of the invention is to provide a special bracket or hanger for the short trunnion whereby the trunnion will be rigidly supported in a predetermined position for effecting efficient cooperation between the elements of the roller mechanism under certain circumstances attending the use of the short trunnion and its single bearing in the roller; and whereby the rattle commonly found in shade rollers of automobiles and other vehicles as a result of looseness between the roller trunnions and their supporting brackets is eliminated.

Another feature of the invention resides in the construction of the roller trunnion and the associated elements of the roller mechanism whereby the trunnion may have two or more bearings in the roller if desired.

The construction and operation of various forms of assemblies that are possible under the principles of the present invention will be fully disclosed hereinafter, reference being had to the accompanying drawings, of which:

Fig. 1 is a longitudinal sectional elevation of one end of a roller and its supporting bracket made and assembled in accordance with the principles of the present invention;

Figs. 2 and 3 are transverse sectional elevations taken on the lines 2—2 and 3—3 respectively of Fig. 1;

Fig. 4 is a longitudinal sectional plan view of a roller and the supporting brackets at opposite ends thereof showing a variation in the assembly from that of Fig. 1;

Fig. 5 is a longitudinal sectional elevation of a spring-loaded roller and its supporting brackets at its opposite ends and shows another variation from the assembly of Figs. 1 and 4;

Fig. 6 is a view similar to Fig. 5 but showing a solid wooden roller and brackets of the type employed with household window shades;

Fig. 7 is a side elevation of a modified form of trunnion for use in rollers of the type shown in Figs. 1 to 6 inclusive;

Fig. 8 is a view similar to Fig. 1 but showing another form of assembly; and

Fig. 9 is a transverse sectional elevation taken on the line 9—9, Fig. 8.

As shown in Figs. 1 to 5 and 8 and 9, the roller 1 is of the hollow barrel type and is composed of sheet metal bent into cylindrical form with the transverse edges of the rolled sheet joined as at 2. The barrel 1 is provided with a longitudinally extending internally rolled portion 3 providing a cavity having a mouth opening on slot 4 adapted to receive and maintain within the cavity one transverse edge of a drop sheet that is adapted to be wound on the roller.

The roller 1, is provided at one end with a trunnion 5 which, as described in the companion application Serial Number 636,072, above noted, is composed of flat rectangular stock shaped to form a head 6, a neck 7, a ratchet portion 8, of lesser width than the head 6, which is provided with indentations 9 providing ratchet teeth on the trunnion, and a shank 10 of lesser width than the ratchet portion 8, providing shoulders 11, 11 on the trunnion adjacent the ratchet portion 8.

The corners 12, 12, of the rectangular shank adjacent the shoulders 11, 11 are substantially straight and parallel and provide a bearing surface 13 for the roller on the trunnion immediately adjacent the shoulders 11, 11.

Beyond the straight edged bearing portion 13 the trunnion tapers convergently, as at 14, and in some instances, as shown in Figs. 1 and 7, the corners of the rectangular cross section of the tapered portion 14 are notched as at 15 to provide a tapering screw thread on the inner end of the trunnion.

The end of the roller 1 is closed by a head 16 centrally apertured at 17 to pass over and revolve freely about the trunnion without contacting with any portion thereof, in the instances shown in Figs. 1, 4, 5 and 6.

The head 16 is provided with a flange composed of segments 18, 18 which project into and fit snugly within the hollow roller 1. The flange segments 18, 18 are secured in the roller 1 by indentations 19, 19 extending into corresponding indentations 20, 20 formed in the flange, to prevent relative axial movement between the roller barrel 1 and the head 16. The slots 18a, 18a formed in the flange between the segments 18, 18 receive the roll 3 and seam 2 of the roller barrel and prevent relative circular movement between the roller barrel 1 and head 16.

Transversely disposed in the roller 1, within the flange of the head 16 and contacting with the indentations 20, is a pawl-carrying plate 21 which is prevented from moving inwardly within the roller by reason of its contact with the indentations 20, 20. Outward movement of the plate 21 relative to the roller is prevented by the heads or outer ends 22 of studs 23 which are riveted or otherwise secured in the plate. The stud heads 22 contact with the inner surface of the roller head 16. Relative circular movement between the plate 21, the flange of the head 16 and the roller barrel 1 is prevented by the roll 3 and seam 2 fitting within notches 18b formed in the plate 21 at opposite sides thereof (see Fig. 2).

Pivotally mounted on the studs 23, 23 are pawls 24, 24 respectively. At various times during the rotation of the roller about the trunnion 5, one or the other of pawls 24 is adapted to engage in one of the indentations 9 in the ratchet portion 8 of the trunnion 5 to arrest rotation of the roller under the influence of the roller-actuating spring. The head 6 of the trunnion normally, though not necessarily, is held in a vertical plane by the bracket in which the trunnion is supported and in order to present the ratchet portion 8 of the trunnion, or at least one of the tooth indentations 9 respectively located in opposite faces of the ratchet portion 8, in the most favorable position to receive the pawls 24 the ratchet portion 8 is twisted circularly about the longitudinal axis of the trunnion, in the neck portion 7 thereof which lies intermediate the head portion 6 and the ratchet portion 8. The angle of the plane of the ratchet portion 8 relative to the vertical plane of the head 6 should be as near as possible to 90°, however, an angle anywhere between 45° and 90° will serve the purpose and an angle of 70° has been found most satisfactory.

If the plane of the head is horizontal, obviously no twist in the trunnion is necessary as the ratchet portion 8 would then assume a horizontal plane and the pawls would cooperate with the tooth indentation 9 in the upper surface of the ratchet portion 8 without difficulty.

The plate 21 is provided with a bearing 25 which is adapted to revolve freely on and about the bearing portion 13 of the trunnion 5.

The plate 21 is also provided with pressed out eyes or staple-like portions 26, 26 through which one end 27 of an outer coil 28 of a double concentric coil spring 30 is threaded to anchor the said end of the said outer coil to the barrel of the roller. The remotely disposed end of the outer coil 28, is integrally connected to and is a continuation of, a correspondingly disposed end of an inner coil 29 of said double coil spring 30.

The opposite end of the said inner coil 29, of the roller-actuating spring 30, that is, the end disposed adjacent the pawl carrier and bearing plate 21, is gradually reduced in diameter, as illustrated at 31, and the convolutions of the smaller end 32 of the inner coil 29 are threaded onto the tapered screw threaded end 14 of the shank 10 of the trunnion 5.

The taper of the trunnion, as the end 32 of the spring is screwed thereonto, expands the convolutions of the said end of the spring and progressively increases the frictional grip of the spring on the trunnion, which for all practical purposes becomes an integral joint between the two. The extreme end of the spring passes off the screw threaded tapered portion of the trunnion onto the plain straight edges 12 of the bearing portion 13 of the trunnion and forms a thrust bearing for and at one side of the bearing 25 of the plate 21. The shoulders 11, 11 of the ratchet portion 8 form a thrust bearing for, and at the opposite side of the bearing 25 of the plate 21, whereby the pawl carrier plate 21 is permitted free rotation about the trunnion but is denied relative axial movement with respect thereto.

The bracket 35, in which the head 6 of the trunnion 5 is mounted, is covered per se in the companion application Serial Number 636,073, above referred to and comprises a base plate 36, composed of sheet metal having a fairly high degree of inherent resiliency, or is capable of acquiring a required amount of resiliency by heat treatment or other hardening process.

The face plate 36 is provided with a rectangular opening 37 of such dimensions as to receive the rectangular head 6 of the trunnion 5 snugly, however, as a result of manufacturers' tolerances, in some instances, a very slight amount of difference may occur between the dimensions of the head 6 and the dimensions of the opening 37. Such differences ordinarily would permit relative movement between these elements which, in the case of automobile shades, due to unavoidable vibrations occurring in the body of the vehicle in which the shade is hung, will cause rattling noises. Furthermore, any slight difference in the sizes of the head 6 and opening 37 will create mechanical looseness between the trunnion and the bracket.

The trunnion 5 in the present case is short and extends but part way through the spring 30 and has no bearing in the roller except that in the pawl carrier plate 21, thus with the spring 30 completely unwound, or nearly so, there would exist a very loose relation between the trunnion, the roller, and the supporting bracket.

In order to overcome this condition, and to take up any looseness between the bracket and trunnion such as would cause rattling, as noted above, the face plate 36 is provided with spring tongues 38, 38, arranged to engage the head 6 of the trunnion on diametrically opposed sides or edges of the trunnion head, said spring tongues extending substantially parallel to the axis of the trunnion and bearing on the top and bottom, to maintain the trunnion substantially rigid in a practically fixed position substantially perpendicular to the face plate 36 of the bracket, so that no lateral sway of the trunnion is permitted and as a result thereof no wabbling action of the roller is present, even though the roller has but a single relatively short bearing on the trunnion.

As the spring is wound, by rotating the roller relative to the fixed trunnion 5, the winding action has been found to occur first in the inner smaller coil 29 of the double coil spring 30. The winding action has the effect of building up or adding additional convolutions to that end of the inner coil remotely situated with respect to the pawl carrier plate 21, to which the opposite end of the outer coil 28 is secured. This effect of adding of convolutions to the inner coil is due to the reduction of the diameter of the inner coil as a result of the winding. By this action the convolutions of the inner coil move into close, firm contact with each other, thereby causing the inner coil to become practically rigid longitudinally. The effect of adding convolutions to the said remotely disposed end of the inner coil increases the length thereof, and tends to stretch the outer coil 28, as clearly shown in Fig. 1, placing the outer coil under tension. As the one end of the outer coil 28 is anchored to the pawl carrier plate 21 at diametrically opposed points with respect to the axis of the trunnion, and the remotely situated end of the outer coil is secured to the corresponding remotely situated end of the substantially longitudinally rigid inner coil 29 the axis of the spring 30 attains a coinciding relation with respect to the axis of the trunnion and the axis of the roller, and, as the plate 21 is held against any tilting movement relative to the roller the spring and trunnion are held in axial alignment with each other and with the roller, consequently, even though the trunnion has but a single relative narrow bearing in the roller the trunnion is maintained in such firm operative coaxially aligned relation to the roller that the roller will rotate concentrically on and without wabbling with respect to the trunnion.

Under such circumstances the roller assembly may be used with brackets wherein no spring tongues 38 or equivalent means for holding the trunnion in perpendicular relation to the face plate of the bracket is provided, such, for example, as in cases where the common form of bracket 35a, such as are used with ordinary wooden household shade rollers 1a, as in Fig. 6, is employed. However, in installations in moving vehicles it is desirable to use a bracket having the spring tongues or their mechanical equivalents to prevent rattling between the trunnion and the bracket.

In some instances a two-point bearing for the roller on the trunnion may be desired. In one case, as shown in Fig. 7, the shank of the trunnion may be provided with an axially aligned extension 40, the remote end of which, which is adapted to extend beyond the free end of the roller-actuating spring, may be mounted in a second bearing 42 in the roller, which, in the case of wooden rollers, such as shown in Fig. 6, may be provided by a counterbore 42 in the end of the main bore 43 in which the actuating spring 30a is located. The second bearing remotely situated with respect to the bearing 25a afforded by the pawl carrier plate 21a will maintain axial alignment between the roller 1a and trunnion 5a irrespective of the state of the spring, whether it be fully unwound or not.

A two-point bearing may be also provided by the construction shown in Figs. 8 and 9, wherein the neck 7b of the trunnion 5b affords a bearing for the head plate 16b of the roller 1b, and wherein the aperture 17b in the head plate 16b is made of a size to fit the neck 7b snugly but in a manner to permit free relative rotation between the head plate and the trunnion. The twist in the neck 7b tends to elongate the possible bearing surface circularly about the trunnion to an extent of approximately 100%, depending upon the angle of the ratchet portion 8b relative to the head portion 6b of the trunnion 5b, over a bearing afforded by the two relatively narrow edges of the rectangular neck in cases where no twist in the trunnion is provided.

In order to prevent or limit longitudinal movement of the rollers in their supporting brackets several methods may be provided in connection with the trunnion to which the actuating spring is anchored. For example, in Fig. 1, the end 39 of the trunnion head 6, may function as a shoulder or abutment to contact with the inner surface of a dish-like shield 45 that is rigidly connected to the bracket face plate 36, as disclosed in the above mentioned copending application Serial Number 636,073, to limit the movement of the trunnion 5, and consequently the entire roller 1 and the drop sheet wound thereon, in a direction toward the bracket 35, while movement of the roller in the opposite direction, see Fig. 4, may be limited by a shoulder formed by a collar 139 on a trunnion 105 that is rigidly secured in and projects perpendicular to a face plate 136 of a bracket 135 at the far end of the roller.

The trunnion 105 in the said far end of the roller projects into and has snug rotative bearing in a disc 121 composed of fibre or other noise absorbing material, which is located in and held between the inner surface of a head plate 116 and indentations 120 of a closure cup having a flange 118 fitting within the end of the roller and secured thereon by indentations 119 projecting into the said indentures 120 of the flange 118.

The collar 139 on the trunnion 105 is disposed between the face plate 136 of the bracket 135 and the bearing plate 121 and limits movement of the roller toward the bracket 135.

In Fig. 4 the drop sheet X has a width that substantially equals the length of the roller upon which it is wound. Some classes of curtain material tend to shrink considerably and expose the ends of the roller. To avoid this condition Fig. 5 shows a curtain of the same width as that shown in Fig. 4, but the roller is relatively shortened so that the edges of the curtain overhang the ends of the roller. In this instance, should the curtain shrink transversely the ends of the roller would not be exposed.

In order to retain the brackets the same distance apart in all cases so as to provide working space for the overhanging edges of the drop sheet, it is necessary to provide means to compensate for the shortening of the roller and in Fig. 5 the trunnion 5c is shown as having laterally extending ears 46, 46 on the head 6c adjacent the neck portion 7c of the trunnion, the ears bearing against the face plate 36c of the bracket 35c. In this case the end 39c of the trunnion 5c does not bear against the shield 45c which may be of deeper disc construction than the shield shown in Fig. 1. At the opposite end of the roller the collar 139c on the trunnion 105c is of greater width than the collar 139 in Fig. 4, and fills the space between the fibre disc 121c and the face plate 136c of the bracket 135c. With this construction the curtain may shrink a considerable amount without exposing the ends of the roller.

In Fig. 4 the end 39 of head 6 of the trunnion 5 does not contact with the shield 45 which, like the shield in Fig. 5, may be of a deeper disc construction than the shield shown in Fig. 1 or of a semispherical construction wherein the end of the trunnion head would be quite distantly spaced from the inner surface of the shield, and in such cases the twist of the trunnion at the neck 7a thereof may form shoulders 39a, 39a that bear against the edges of the face of the plate 36 at the mouth of the opening 37a therein and in which the trunnion head 6 is disposed.

In cases such as that illustrated in Fig. 6, wherein the bracket 35a is of the common variety usually employed with household window shades and is devoid of a shield, the trunnion 5a is provided with ears 46a, 46a, one or the other or both of which may bear against the face of the bracket and limit the movement of the roller 1 in a direction toward the bracket 35a.

The roller 1a in this instance is of the wooden type bored inwardly from one end as shown at 45 to receive the double coil actuating spring 30a, the one end of the outer coil 28a of which is secured to a pawl carrier plate 21a, in the same manner as noted above and as shown in Figs. 1 and 3, while the corresponding end of the inner coil 29a is anchored to the tapered end of the trunnion 5a in the manner disclosed in Fig. 1 or Fig. 8.

The pawl carrier plate in this instance is provided with lugs 51 which are bent outwardly from the plate and driven into the end of the wooden roller 1a to lock the plate and roller together. The plate 21a is provided with a flange 52 which in effect is an extension to the roller 1a and provides a cavity for the pawls 24a. The end of the roller is closed by a cap comprising a head 16a and a flange 18a that extends over the flange 52 of the pawl carrier plate 21a and the adjacent portion of the roller 1, and is crimped into the wooden roller behind the plate 21a.

With the construction of the power unit that includes the plate 21, the short trunnion 5 and the spring 30 any slight misalignment of these elements with respect to each other and to the roller will not affect the efficient operation of the device, for the reason that, while the inner coil 29 of the spring stiffens longitudinally when the spring 30 is wound to some extent at least and thereby stabilizes the short trunnion 5 in its sole bearing 25 in the plate 21, the inner coil 29, of the spring 30, or the spring 30 as a whole, can flex laterally to some extent when such slight misalignment of these elements occurs, or when the bracket which supports the short trunnion 5 is not in true axial alignment with the roller.

I claim:

1. The combination of a roller, a short trunnion rotatably mounted in one end thereof, and a spring having one end secured to the inner end of the trunnion and its opposite end secured to the roller adjacent said trunnion with the body of the spring extending into the roller beyond the said inner end of the trunnion.

2. The combination of a roller, a plate at one end of the roller, a short trunnion rotatably mounted in the plate, and a spring having one end secured to the inner end of the trunnion and its opposite end secured to said plate adjacent said trunnion with the body of the spring extending into the roller beyond the said inner end of the trunnion.

3. The combination of a roller, a plate at one end of the roller, a short trunnion rotatably mounted in the plate with one end projecting into the roller, and a spring comprising inner and outer coils concentrically arranged about the trunnion and extending into the roller beyond the projecting end of the trunnion with one end of the inner coil secured to the projecting end of the trunnion and the corresponding end of the outer coil secured to the plate.

4. The combination of a roller, a plate at one end of the roller, a short trunnion having a sole rotative bearing intermediate its ends in the plate, and a spring comprising inner and outer coils concentrically arranged about and extending beyond the inner projecting end of the trunnion and having one end of the inner coil connected thereto with the corresponding end of the outer coil connected to the plate, said connections functioning as the sole means of support for the spring within the roller.

5. The combination of a roller, a trunnion rotatably mounted in one end of the roller, a tapered anchorage formed on the trunnion, a spring having one end encircling the tapered anchorage and expanded thereby into rigid gripping contact with the trunnion, and means for securing the opposite end of the spring to the roller.

6. The combination of a roller, a trunnion rotatably mounted in one end of the roller, a tapered screw-threaded anchorage formed on the trunnion, a coiled spring having convolutions of a normally cylindrical end thereof threaded onto the tapered screw-threaded anchorage and expanded thereby into rigid gripping contact with the trunnion, and means for securing the opposite end of the spring to the roller.

7. The combination of a roller, a trunnion rotatably mounted in one end of the roller and comprising a tapered anchorage having a rectangular cross section, a spring having one normally cylindrically coiled end encircling the tapered rectangular anchorage and expanded thereby into rigid gripping contact with the longitudinal corners of the said tapered rectangular anchorage, and means for securing the opposite end of the spring to the roller.

8. The combination of a roller, a trunnion rotatably mounted in one end of the roller and comprising a tapered anchorage rectangular in cross section and notched at spaced intervals along its longitudinal corners, a spring having the convolutions of a normally cylindrically coiled end thereof seated in said notches and expanded by the taper of said anchorage into rigid gripping contact therewith, and means for securing the opposite end of the spring to the roller.

9. The combination of a roller, a plate transversely disposed in the roller, a trunnion rotatably mounted in the plate, a tapered portion on the trunnion at one side of the plate, and a double spring comprising inner and outer concentrically arranged coils projecting from the plate and beyond the tapered portion of the trunnion and operatively connected together at their ends remotely situated with respect to the plate, the opposite end of the inner coil encircling the tapered portion of the trunnion and expanded thereby into rigid gripping contact therewith and the corresponding end of the outer coil secured to said plate.

10. The combination of a roller, a plate transversely disposed in the roller, a short trunnion rotatably mounted in the plate, a tapered end on the trunnion at one side of the plate, and a double spring at said side of the plate comprising inner and outer concentrically arranged coils projecting beyond the said end of the short trunnion and connected together at their ends remotely situated with respect to the plate, the opposite end of the inner coil encircling the tapered end of the trunnion and expanded thereby into rigid gripping contact therewith and the corresponding end of the outer coil secured to said plate.

11. A roller power unit comprising a plate, a short trunnion rotatably mounted in the plate, and a spring extending from the plate and beyond a projecting end of the trunnion and returning upon itself to the plate with the opposite ends of the spring secured to the plate and to the projecting end of the trunnion respectively.

12. A roller power unit comprising a plate, a short trunnion rotatably mounted in said plate, a spring extending from the plate and beyond one projecting end of the trunnion and returning upon itself to the plate with its opposite ends secured to the said projecting end of the trunnion and to the plate respectively, a ratchet portion on the trunnion at the opposite side of the plate from the spring, and a pawl pivotally mounted on the last said side of the plate for engagement with the said ratchet portion of the trunnion.

13. A roller power unit comprising a plate, a short trunnion rotatably mounted in said plate, a spring extending from the plate and beyond one projecting end of the trunnion and returning upon itself to the plate with its opposite ends secured to the said projecting end of the trunnion and to the plate respectively, a ratchet portion on the trunnion at the opposite side of the plate from the spring, a pawl pivotally mounted on the last said side of the plate for engagement with the said ratchet portion of the trunnion, and a cap enclosing the said plate, pawl and ratchet portion of the trunnion.

14. A roller power unit comprising a plate, a short trunnion rotatably mounted in said plate, a spring extending from the plate and beyond one projecting end of the trunnion and returning upon itself to the plate with its opposite ends secured to the said projecting end of the trunnion and to the plate respectively, a ratchet portion on the trunnion at the opposite side of the plate from the spring, a pawl pivotally mounted on the last said side of the plate for engagement with the said ratchet portion of the trunnion, a cap enclosing the said plate, pawl and ratchet portion of the trunnion and providing means for securing the power unit to the roller, and a rectangular head on the trunnion and projecting beyond the cap whereby the trunnion may be non-rotatably supported for actuating the roller.

15. The combination of a roller, a trunnion rotatably mounted in and projecting beyond one end of the roller, a support outside and disposed adjacent the said end of the roller and having an opening for receiving the projecting end of the trunnion, and resilient means carried by the support for engaging the projecting portion of the trunnion.

16. The combination of a roller, a trunnion having a single bearing in one end of the roller and a flat sided head projecting beyond the said end of the roller, and a bracket comprising a plate having an opening arranged to receive the said head of the trunnion and spring tongues extending laterally from the plate for longitudinally engaging the trunnion to maintain the trunnion substantially perpendicular to the plate of the bracket.

17. The combination of a roller, a trunnion of rectangular cross section throughout at one end of the roller and comprising a flat head portion projecting beyond the end of the roller, a flat ratchet portion adjacent said head, a reduced shank projecting from said ratchet portion producing laterally extending shoulders on the trunnion, a plate disposed transversely of the roller and having bearing on the shank adjacent said shoulders, a tapered end on the shank adjacent said plate, a double spring comprising inner and outer concentric coils projecting from the plate beyond the tapered end of the shank, the end of the inner coil adjacent the plate encircling the tapered end of the shank and expanded thereby into rigid gripping contact therewith, said spring end functioning as a thrust bearing for the plate at the side opposite to that lying adjacent said shoulders, the corresponding end of the outer coil being secured to the plate, and pawls pivotally mounted on the plate for engagement with the said flat ratchet portion of the trunnion.

18. The combination of a roller, a trunnion of rectangular cross section throughout at one end of the roller and comprising a flat head portion projecting beyond the end of the roller, a flat ratchet portion adjacent said head, a reduced shank projecting from said ratchet portion producing laterally extending shoulders on the trunnion, a plate disposed transversely of the roller and having bearing on the shank adjacent said shoulders, a tapered end on the shank adjacent said plate, a double spring comprising inner and outer concentric coils projecting from the plate beyond the tapered end of the shank, the end of the inner coil adjacent the plate encircling the tapered end of the shank and being expanded thereby into rigid gripping contact therewith, said spring end functioning as a thrust bearing for the plate at the side opposite to that lying adjacent said shoulders, the corresponding end of the outer coil being secured to the plate, and pawls pivotally mounted on the plate for engagement with the said flat ratchet portion of the trunnion, said flat ratchet portion being twisted circularly about the axis of the trunnion with respect to the said flat head portion thereof to facilitate said engagement by said pawls.

19. The combination of a roller, a trunnion of rectangular cross section throughout at one end of the roller and comprising a flat head portion projecting beyond the end of the roller, a flat ratchet portion adjacent said head, a reduced shank projecting from said ratchet portion, a plate disposed transversely of the roller and having bearing on the shank adjacent said shoulders, pawls on the plate for engagement with the said flat ratchet portion of the trunnion, said flat ratchet portion being twisted circularly about the axis of the trunnion with respect to the said flat head portion thereof to facilitate said engagement by said pawls, said twist forming a second bearing surface for the roller on the trunnion in spaced relation to the bearing surface afforded by said shank, and a second plate disposed transversely of the roller in parallel spaced relation to the first said plate and bearing on the said twisted portion of the trunnion.

20. The combination of a roller, a trunnion of rectangular cross section throughout at one end of the roller, and comprising a head projecting beyond the end of the roller, a ratchet portion adjacent the head, a reduced shank adjacent the ratchet portion providing a laterally extending shoulder on the trunnion, a tapered portion on the shank, an extension on and projecting from the smaller end of the tapered portion of the shank, a plate disposed transversely of and secured in the roller and having a bearing on the shank adjacent said shoulder, a spring having one end secured to the roller and its other end encircling the tapered portion of the trunnion and expanded thereby into rigid gripping contact therewith, said shank extension projecting through the spring and having a bearing in the roller beyond the spring.

WALTER J. STUBER.